US012572465B2

(12) United States Patent
Rudrappa et al.

(10) Patent No.: US 12,572,465 B2
(45) Date of Patent: Mar. 10, 2026

(54) DATA STORAGE DEVICE AND METHOD FOR BUFFER OCCUPANCY-BASED DATA PLACEMENT TO AVOID VIDEO LOSS

(71) Applicant: Sandisk Technologies, Inc., Milpitas, CA (US)

(72) Inventors: Nagaraj Dandigenahalli Rudrappa, Davangere (IN); Narendra Bayanaboina, Mydukur (IN); Dattatreya B. Nayak, Udupi (IN); Silky Mohanty, Bangalore (IN); Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/825,319

(22) Filed: Sep. 5, 2024

(65) Prior Publication Data

US 2026/0064583 A1     Mar. 5, 2026

(51) Int. Cl.
*G06F 12/02* (2006.01)
*G06F 3/06* (2006.01)

(52) U.S. Cl.
CPC ........ *G06F 12/0246* (2013.01); *G06F 3/0613* (2013.01); *G06F 3/0656* (2013.01); *G06F 3/0679* (2013.01); *G06F 2212/7203* (2013.01)

(58) Field of Classification Search
CPC .. G06F 12/0246; G06F 3/0613; G06F 3/0656; G06F 3/0679; G06F 2212/7203
See application file for complete search history.

(56) References Cited

U.S. PATENT DOCUMENTS

| | | | |
|---|---|---|---|
| 7,849,365 B2 | 12/2010 | Herman | |
| 8,544,424 B2 | 10/2013 | Chang et al. | |
| 8,775,480 B2 | 7/2014 | Carson et al. | |
| 9,891,847 B2 | 2/2018 | Ravimohan et al. | |
| 9,996,457 B2 | 6/2018 | Post et al. | |
| 10,153,046 B1 | 12/2018 | Agarwal et al. | |
| 11,036,407 B1 | 6/2021 | Tikoo et al. | |
| 2010/0293321 A1 | 11/2010 | Weingarten | |
| 2014/0006859 A1 | 1/2014 | Ryu | |
| 2015/0280865 A1 | 10/2015 | Wood | |
| 2016/0098213 A1 | 4/2016 | Franceschini et al. | |
| 2019/0393888 A1* | 12/2019 | Bergmann | G06F 3/0656 |
| 2021/0255803 A1 | 8/2021 | Kanno | |

(Continued)

OTHER PUBLICATIONS

U.S. Appl. No. 11/409,672 B2, filed Aug. 2022, Zheng.
Non-final Office Action mailed Aug. 22, 2025 for U.S. Appl. No. 18/825,264.

*Primary Examiner* — Nanci N Wong
(74) *Attorney, Agent, or Firm* — Crowell & Moring LLP

(57) ABSTRACT

A host may not have a large enough internal non-volatile memory to store generated data, such as video. In such situations, the host can store the data in an external data storage device, such as an external solid-state drive (SSD). However, if the storage rate of the external data storage device drops below the rate at which the host is generating and sending the data to the external data storage device, data loss can occur. To help avoid this situation, when a low storage rate is detected, the host can route a portion of data generated by the host to a non-volatile memory in the host for temporary storage and later transfer that data to the external data storage device when the storage rate increases.

20 Claims, 8 Drawing Sheets

(56)     References Cited

U.S. PATENT DOCUMENTS

| | | | |
|---|---|---|---|
| 2022/0096054 A1* | 3/2022 | Vignon | ................ G10K 11/346 |
| 2022/0155999 A1 | 5/2022 | Sikarwar et al. | |
| 2023/0153125 A1 | 5/2023 | Subramanian | |

* cited by examiner

DATA STORAGE DEVICE AND METHOD FOR BUFFER OCCUPANCY-BASED DATA PLACEMENT TO AVOID VIDEO LOSS

BACKGROUND

A data storage device can be used to store data from a host. In some situations, an external data storage device (e.g., an external solid-state drive (SSD)) is used to store data that requires more storage capacity than available in the host.

DETAILED DESCRIPTION

Figures 1A, 1B, 1C:
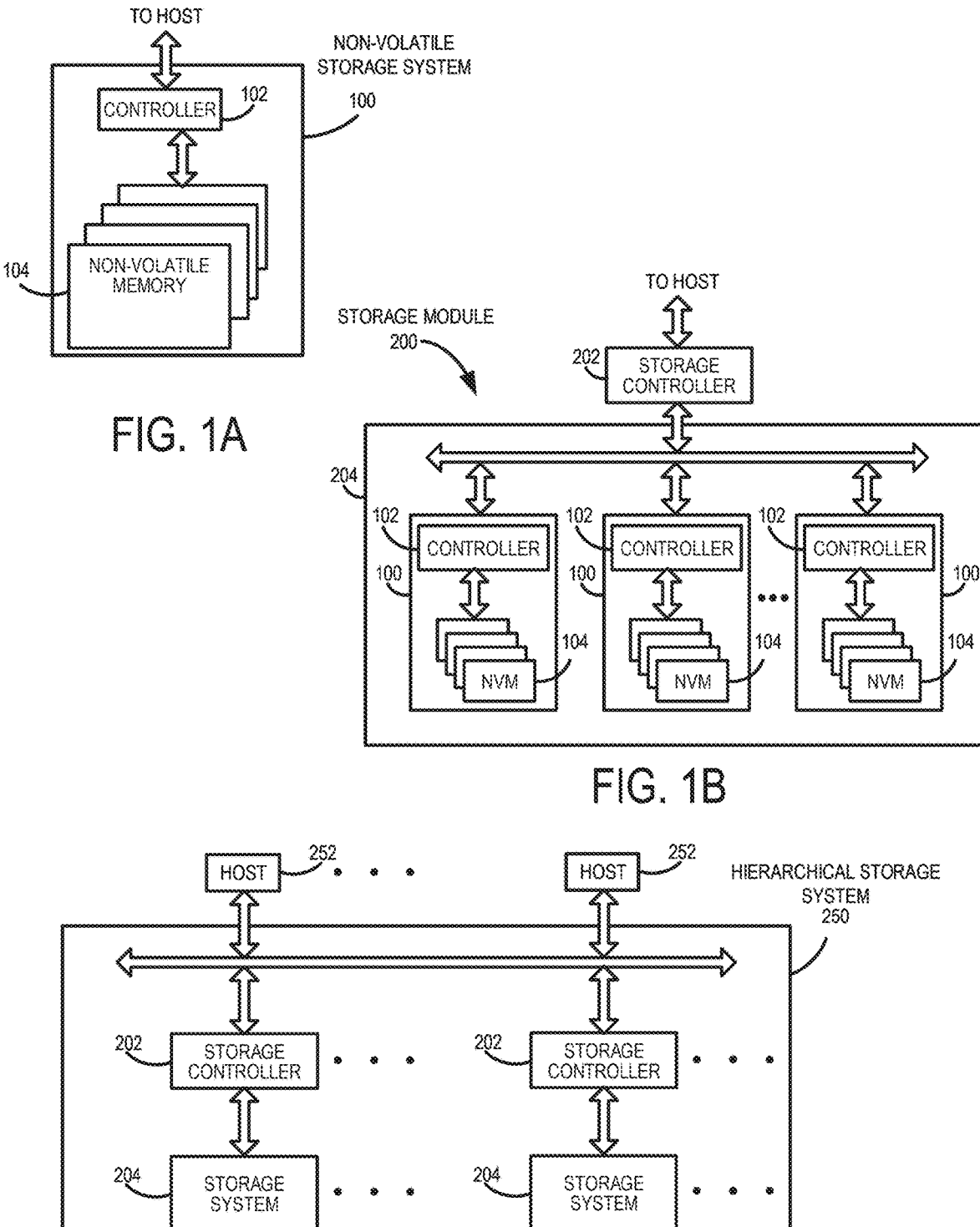
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for buffer occupancy-based data placement to avoid video loss. In one embodiment, a method is provided that is performed in a host in communication with an external data storage device and comprising a first volatile memory, a second volatile memory, and a non-volatile memory. The method comprising: determining whether a storage rate of the external data storage device is below a threshold; in response to determining that the storage rate of the external data storage device is not below the threshold, sending a portion of data generated by the host to the first volatile memory for transfer to the external data storage device for storage; and in response to determining that the storage rate of the external data storage device is below the threshold: sending the portion of the data generated by the host to the second volatile memory for transfer to the non-volatile memory for storage; determining whether the storage rate of the external data storage device has increased above the threshold; and in response to determining that the storage rate of the external data storage device has increased above the threshold, sending the portion of the data stored in the non-volatile memory to the first volatile memory for transfer to the external data storage device for storage.

In another embodiment, a host is provided comprising a non-volatile memory; a primary buffer; a secondary buffer;

and one or more processors. The one or more processors, individually or in combination, are configured to: determine whether an available capacity of the primary buffer is below a threshold; in response to determining that the available capacity of the primary buffer is not below the threshold, send a portion of data generated by the host to the primary buffer for transfer to an external data storage device for storage; and in response to determining that the available capacity of the primary buffer is below the threshold: send the portion of the data generated by the host to the secondary buffer for transfer to the non-volatile memory for storage; determine whether the available capacity of the primary buffer is above the threshold; and in response to determining that the available capacity of the primary buffer is above the threshold, send the portion of the data stored in the non-volatile memory to the primary buffer for transfer to the external data storage device for storage.

In yet another embodiment, a host is provided comprising a non-volatile memory; a first volatile memory; a second volatile memory; and means for routing a portion of data generated by the host to the first volatile memory for transfer to an external data storage device for storage or to the second volatile memory for transfer to the non-volatile memory for storage based on a capacity of the first volatile memory.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
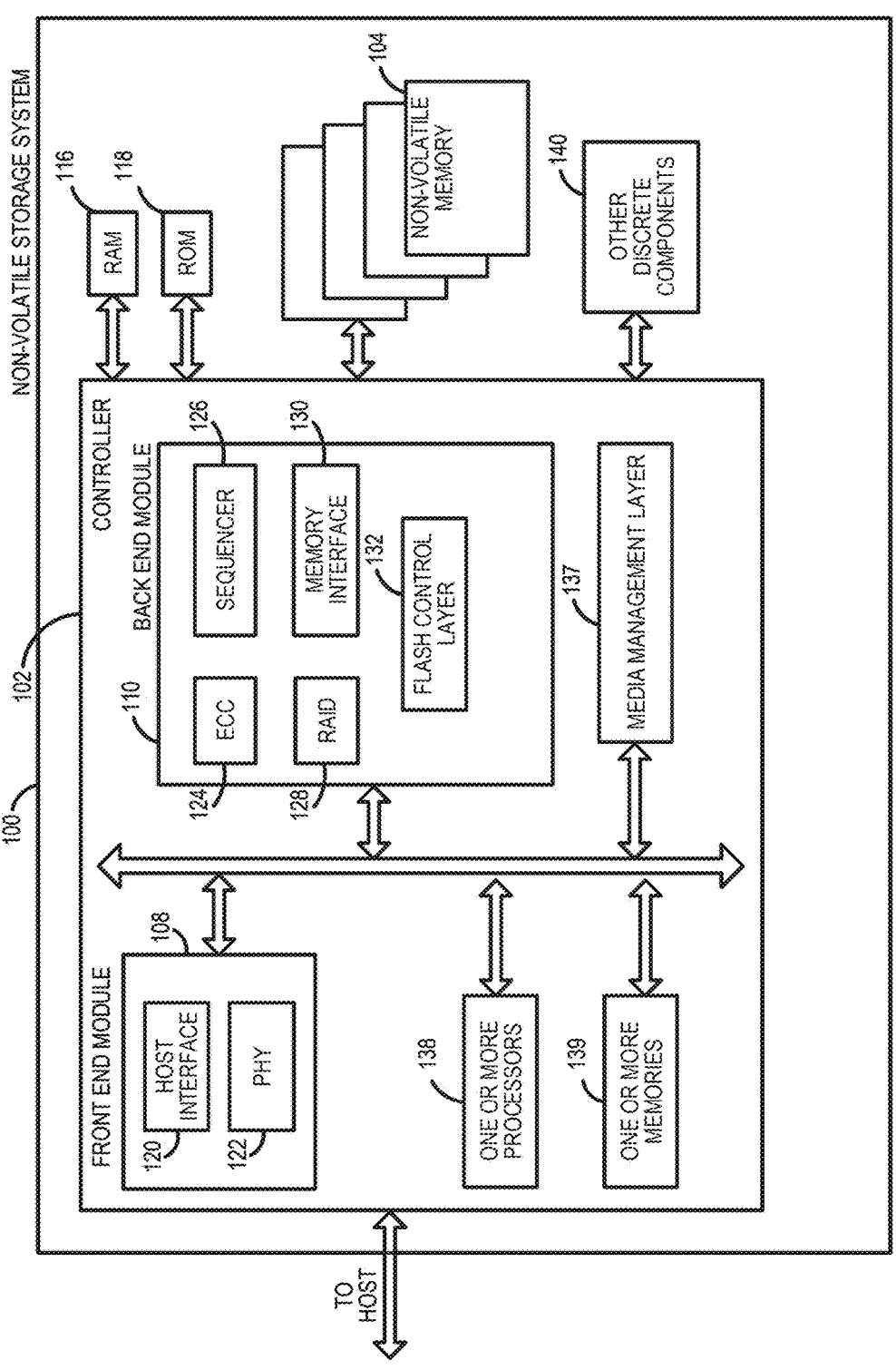
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/ or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
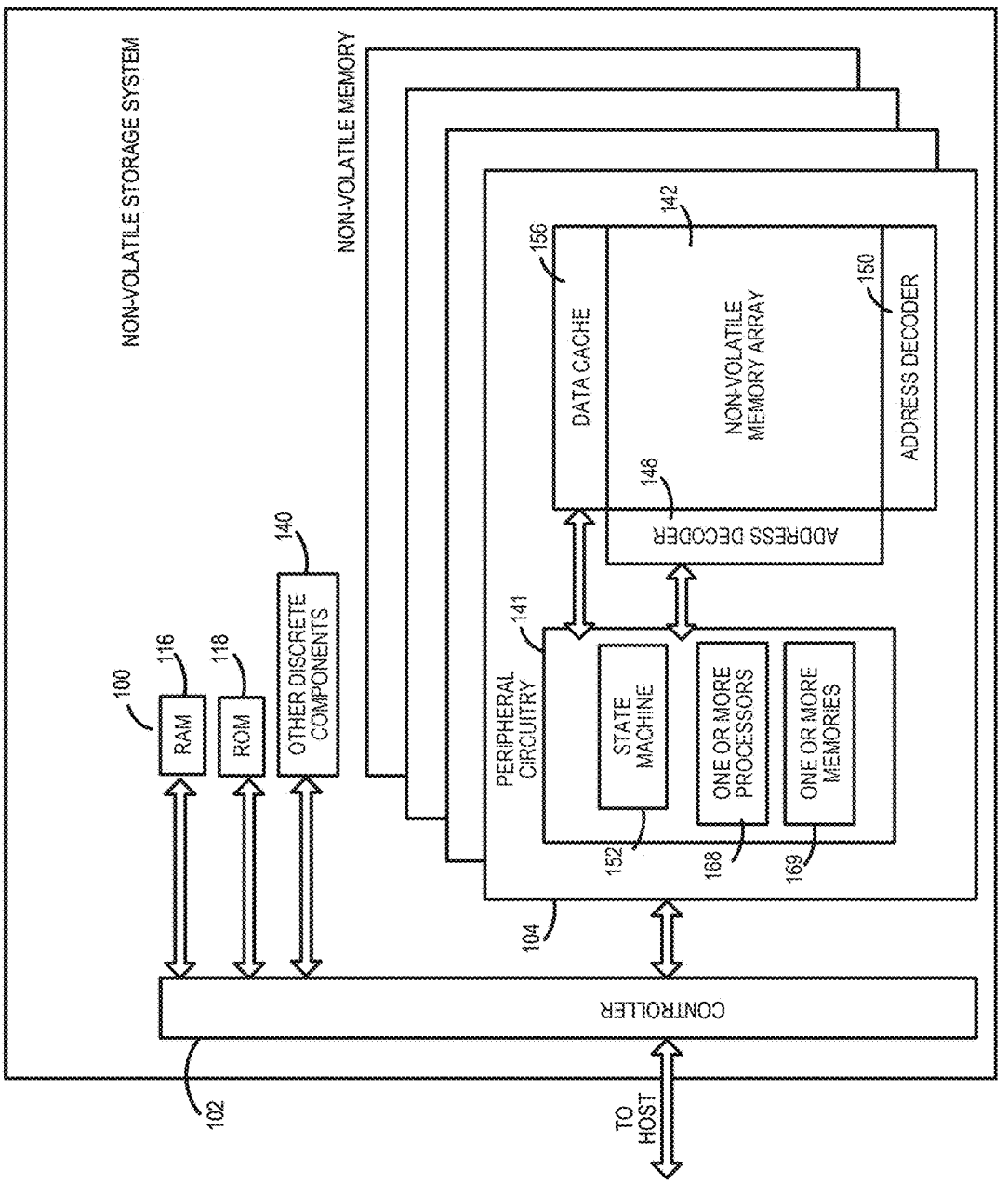
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
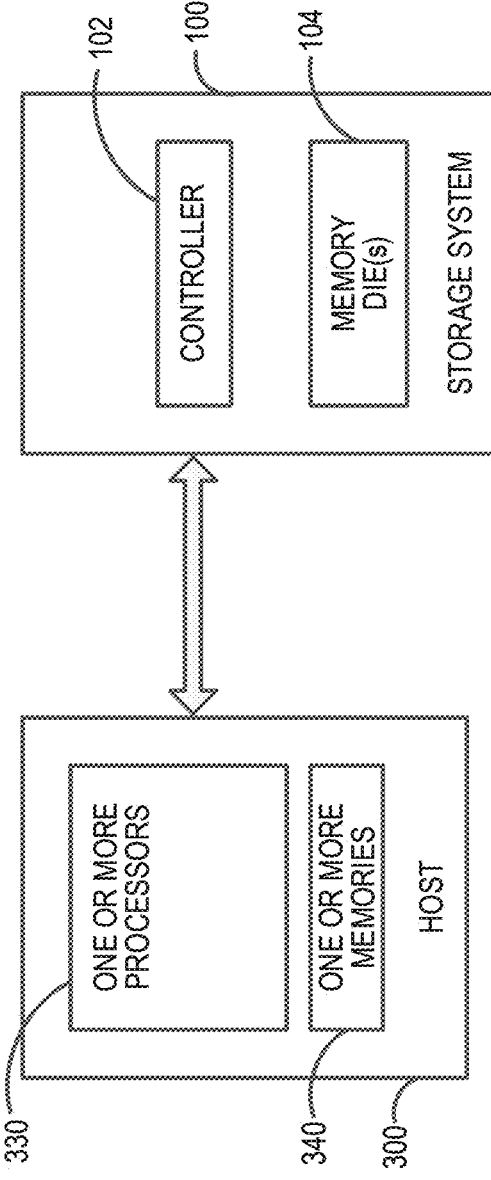
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, a data storage device can be used to store data from a host. In some situations, an external data storage device (e.g., an external solid-state drive (SSD)) is used to store data that requires more storage capacity than available in the host. For example, a mobile device's internal non-volatile memory may not be large enough to store a video that requires a relatively-large amount of storage space. In such situations, video recorded in real-time by the mobile device can be flushed (from the host's internal volatile memory) to an external data storage device, such as an external solid-state drives (SSD). This enables direct video recording storage by the mobile device to the SSD when the mobile device's non-volatile internal memory is not used to store the video. This is illustrated in the example shown in FIG. 4.

Figure 4:
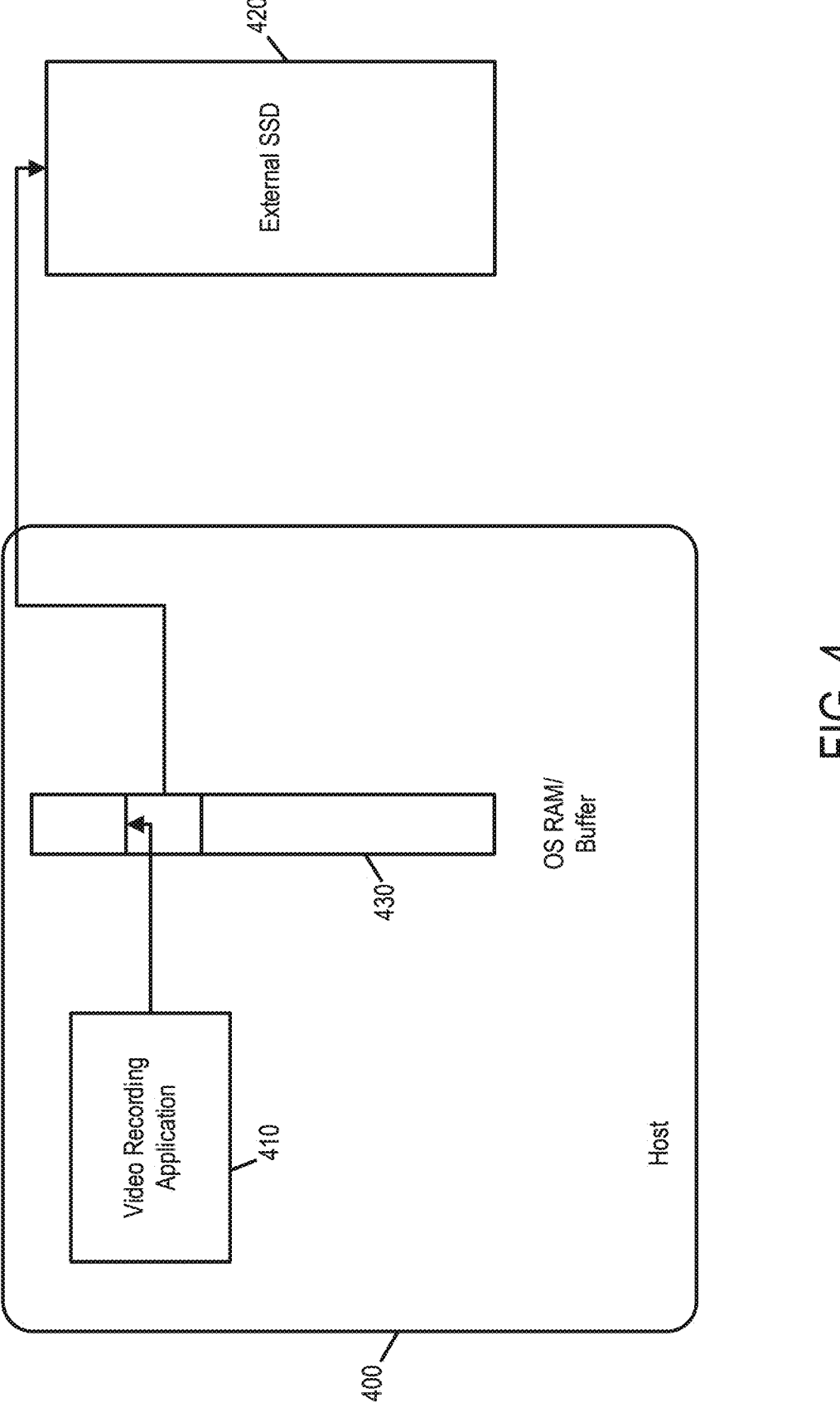
FIG. 4 is a block diagram of a direct storage architecture of an embodiment.

As shown in FIG. 4, the host 400 (e.g., a mobile phone) has a video recording application 410 that records approximately 1.8 TB of data in two hours (i.e., a 4K 60 frames-per-second (fps) recording). In this example, the host's internal non-volatile memory (not shown) is not large enough to store this video, so the host 400 directly stores the video in an external SSD 420. It should be noted that while the host's non-volatile internal memory is not used to store the video in this direct storage environment, the video can be temporarily stored (e.g., as the video is being recorded) in the host's volatile memory 430 (here, an operating system (OS) RAM/buffer) on its way to the external SSD 420.

The direct storage architecture in FIG. 4 can encounter several problems. For example, the host's video recording application 410 is continuously writing data into the OS buffer 430 at a certain rate. So, if the external SSD 420 cannot keep up with this rate, existing data in the OS buffer 430 can be overwritten with new data before the existing data can be written to the external SSD 420. Consider the example in which the external SSD 420 has an average write sustained performance rate of X MBPS. If, for any reason, the external SSD 420 drops below a minimum performance rate for a glitch-free recording, there is a possibility that the OS buffer 430 will be overwritten with new data from the video recording application 410. The video recording application 410 and the OS buffer 430 do not have a back-pressure mechanism to slow down the data production rate because the video recording application 410 is recording video in real time (e.g., a live-stream sports event). So, when this situation arises, frames are dropped due to buffer overwrites, which result in data loss when the user plays back the video and, therefore, results in a bad user experience. As shown by this example, the continuity of usage of the external SSD 420 can be based on its internal state, where continuity of usage refers to the external SSD 420 not receiving the video frame because it is operating slowly (as opposed to incorrectly returning data).

The following embodiments can be used to address this situation. In one embodiment, on detecting that the OS buffer occupancy that interfaces with the external non-volatile data storage device is more than a threshold, the host driver (e.g., executed by the host's one or more processors, individually or in combination) routes some portion of the live data at logical block address (LBA) granularity (or typical storage 4 KB fragment granularity) to the OS buffer that interfaces with an internal non-volatile memory. This avoids overflow in the first OS buffer and, hence, avoids the video corruption due to inherent temporary slowness in the external non-volatile data storage device. The intention is to avoid an overflow in the first place by proactive dual-routing mechanisms.

The host driver may also break the alignment in the live stream at a flash management unit (FMU) granularity (e.g., aligned eight sectors) to ensure that the live stream is aligned to both the external and internal non-volatile storage components and reload data from the internal non-volatile memory to flush to the external data storage device at an appropriate time (e.g., either during the recording or during an idle time). The host may conditionally mark the data as incomplete in the external data storage device until it completely settles off all the data in its internal non-volatile memory.

Any incomplete data transfer completion to the external data storage device can be handled by a bookkeeping module. This module checks if the device throughput recovers above a desired quality of service (QoS), after which it interleaves the streaming data (live) along with locally-saved old streaming data and increases the data transfer rate. During idle time, at other low QoS time, or prior to shut down, the bookkeeping module can transfer any remaining data written in the internal non-volatile memory to the external data storage device.

More specifically, in this embodiment, the host layer maintains two volatile memory buffers (a primary buffer and a secondary buffer) to intelligently handle scenarios where the external data storage device's performance drops below a minimum performance for a glitch-free recording and preserves the potential frames that can be lost due to reduced external data storage device performance. In operation, when the primary buffer has a chance to overflow, the host copies data to the secondary buffer and then stores it to non-volatile memory internal to the host. The data can be LBA tagged. The primary buffer can overflow if the external data storage device is slow to consume data, as monitored by a host application based on data consumption speed. Once the external data storage device can operate at a desired speed, the host can flush data from the internal non-volatile memory to the external data storage device and can invalidate internal non-volatile memory data. LBA or FMU granularity can be used for such routing and copy-back functions. This way, potential frames that might be lost due to slow external data storage device performance can be avoided.

Figure 5:
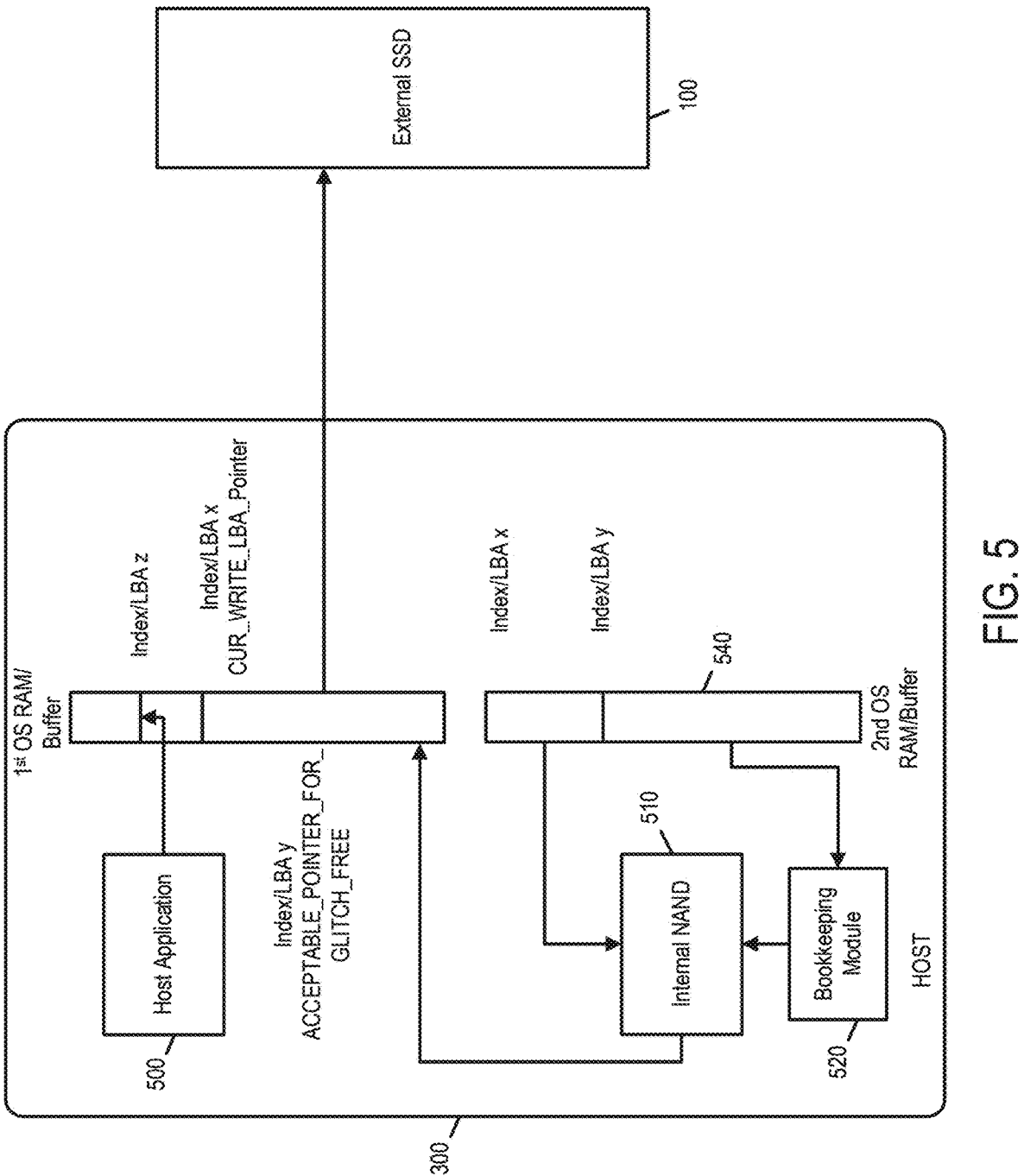
FIG. 5 is a block diagram of a storage architecture of an embodiment.

As example implementation of this embodiment will now be described in conjunction with FIGS. 5-7. FIG. 5 is an illustration of a storage architecture of an embodiment. As shown in FIG. 5, in this example, the host 300 comprises a host application 500 (e.g., a video and/or audio recording application that is stored in one or more memories and executed, individually or in combination, by one or more processors in the host 300), an internal non-volatile memory 510 (e.g., NAND), a bookkeeping module 520 (which can be an application also stored in one or more memories and executed, individually or in combination, by one or more processors in the host 300), a first volatile memory 530 (e.g., here, a first OS RAM buffer), and a second volatile memory 540 (e.g., here, a second OS RAM buffer). While the two volatile memories are shown as separate units, the two volatile memories can be part of the same memory unit. Also, while the host application 500 writes live-stream video data in this example, any suitable type of data can be used. Further, the actions described below with respect to the host 300 can be performed by the one or more processors 330 of the host 300, individually or in combination.

Figures 6, 7:
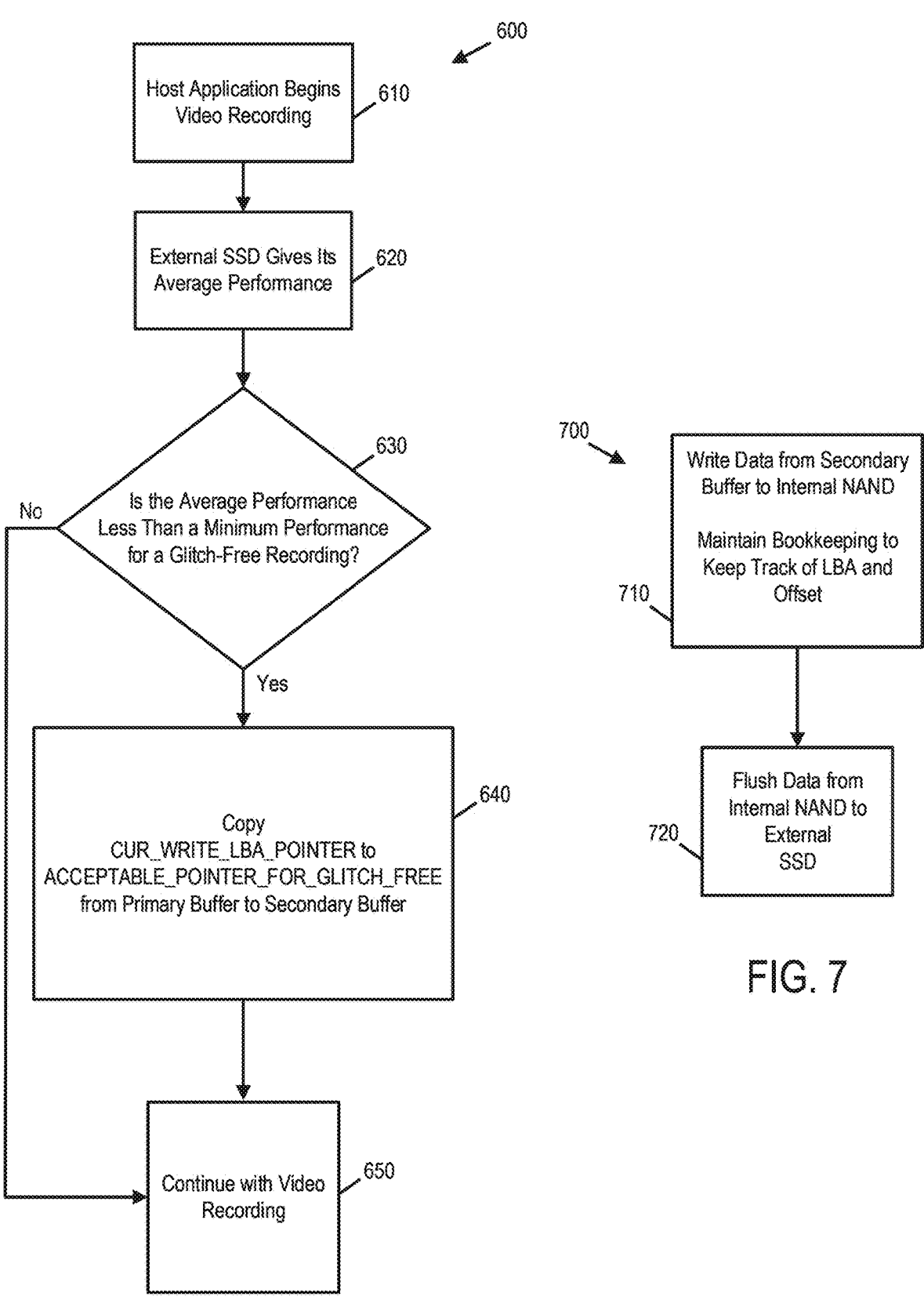
FIG. 6 is a flow chart of a method of an embodiment for recording video data in an external data storage device.
FIG. 7 is a flow chart of a bookkeeping method of an embodiment.

As shown in the flow chart 600 in FIG. 6, the host application begins video recording (610), and the external SSD 100 provides its average performance metric (620). The host 300 then determines if the average performance metric is less than the minimum performance needed for a glitch-free recording (630). If it isn't, the host continues with the video recording (650). However, if it is, the host 300 copies the current write LBA pointer from the first (primary) buffer 530 to the second (secondary) buffer 540 (640). The host then continues with the video recording (650). Further, as shown in the flow chart 700 in FIG. 7, the host 300 writes the data from the secondary buffer 540 to the internal non-volatile memory 510 and maintains bookkeeping to keep track of the LBA and offset (710). Then, the host 300 flushes data from the internal non-volatile memory 510 to the external data storage device 100 (720).

Additionally, a module in the data storage device side (e.g., at the FTL layer) can understand different payloads and differentiate streaming and non-streaming data. When this module detects streaming data in an incoming payload, it can inform the host 300 about the current possible sustainable write throughput via a vendor-specific command. This module can be calibrated for the sustainable write throughput though various payloads along with streaming data, memory error handling scenarios, high/low temperature handling causing reduced throughput, and/or garbage collection, read scrub, or any memory housekeeping operation. This module can proactively inform the host 300 about a change (increase or decrease) when any of the above-mentioned situations change. The proactive information can allow the host 300 to perform different routing based on the hinted QoS handling information.

Further, a module on the host side can recognize the vendor-specific command and understand the current throughput supported by the data storage device 100. When the throughput is less than a desired QoS throughput for glitch-free recording, the host 300 can reduce the data written to the primary buffer 530 for device consumption and aggregate excessive generated data in the secondary buffer 540 and written to the internal non-volatile memory 510. The host 300 can also track the LBA corresponding to the data written to the internal non-volatile memory 510. When the device throughput recovers above the desired QoS, the host 300 can interleave the streaming data along with locally-saved old streaming data and increase the data transfer rate. During idle time, any remaining data written in the internal non-volatile memory 510 can be flushed to the data storage device 100.

In another embodiment, the bit rate at the source is reduced based on a vendor-specific hint from the external data storage device (e.g., based on a storage state machine). This way, the generated bit rate may be reduced to avoid a buffer overflow. Temperature or increased garbage collection can be reasons for the external data storage device to throttle the host stream. In some implementations, this is just an additional mechanism, as some original equipment manufacturer (OEM) customers may not prefer a lower-quality capture just because the state of the external portable data storage device cannot handle a higher QoS stream.

More specifically, due to various factors (such as temperature, garbage collection, and error handling in the data storage device), it might be impossible to meet the agreed QoS throughput in some instances. So, during those times, the data storage device 100 can send a vendor-specific request to the host 300 to reduce the bit rate sustainable by the data storage device 100. The host 300 can acknowledge this request and write sectors proportional to the proposed new bit rate to the primary buffer 530. Once the data storage device 100 recovers to operate at the desired QoS throughput, the data storage device 100 can inform the host 300 using the same vendor-specific command. The host 300 can resume using the single primary buffer 530 to flush the data to external data storage device 100. Stream data that is stored in internal non-volatile memory 510 during the reduced-bit-rate phase can be flushed to the data storage device 100 during idle time.

Figure 8:
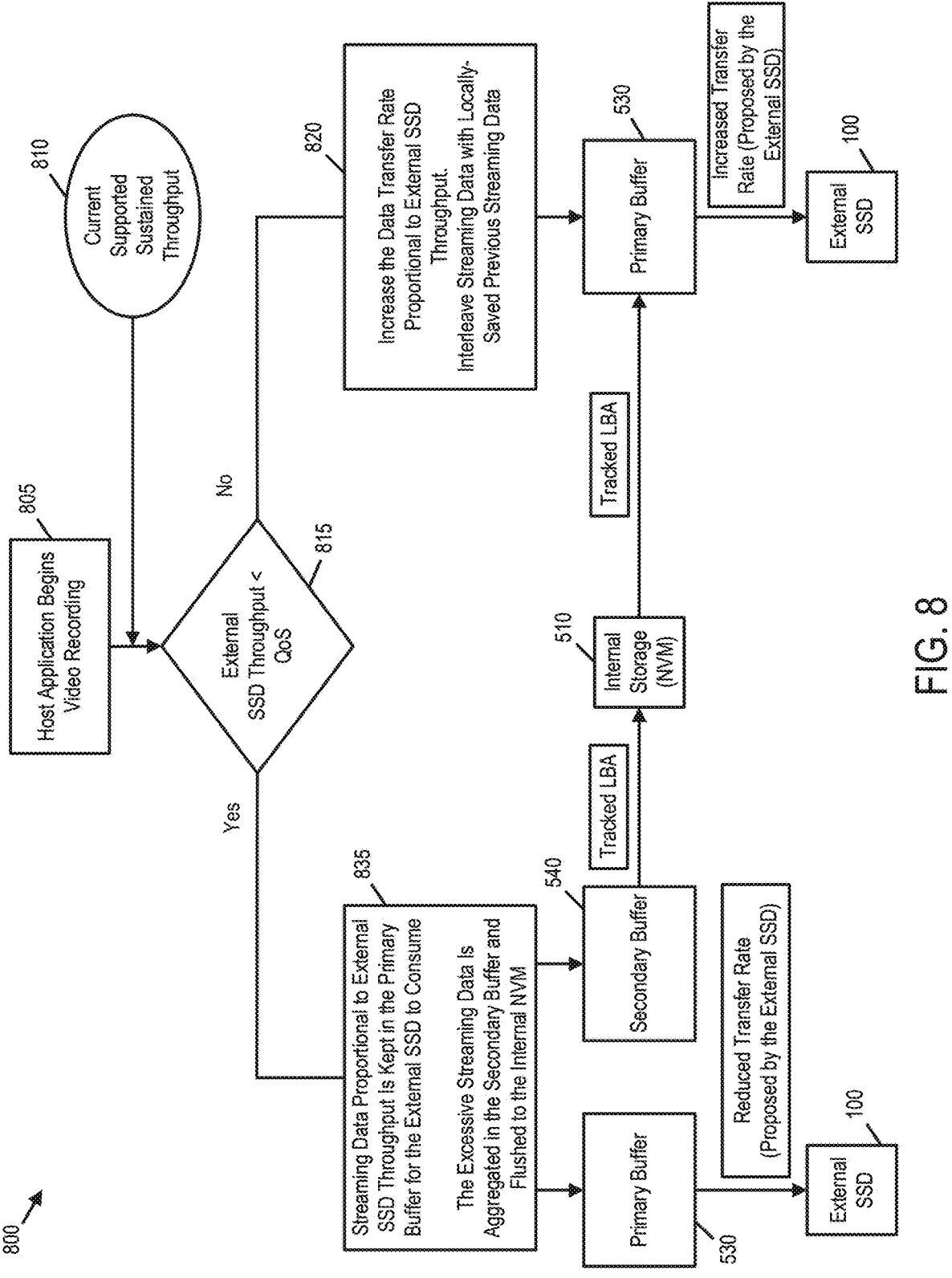
FIG. 8 is an illustration of a process flow of an embodiment.

The example process flow 800 in FIG. 8 illustrates the various concepts discussed above. As shown in FIG. 8, the host application 500 begin video recording (805), and the host 300 determines whether the throughput of the external SSD 100 is less than a quality of service (QoS) requirement (815). If the throughput of the external SSD 100 is less than the QoS requirement, streaming data proportional to the external SSD throughput is kept in the primary buffer 520 for the external SSD to consume, and the excessive streaming data is aggregated in the secondary buffer 540 and flushed to the host's internal non-volatile memory 510 (835). However, if the throughput of the external SSD 100 is not less than the QoS requirement, the host 300 increases the data transfer rate proportional to the external SSD's throughput and interleaves streaming data with locally-saved previous streaming data (820).

There are several advantages associated with these embodiments. For example, these embodiments can help provide a glitch-free video recording. This can provide a good user experience in video recording applications by helping ensure that the data storage device does not drop data due to slightly-reduced speeds, thereby improving quality of service.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. In a host in communication with an external data storage device, wherein the host comprises a first volatile memory, a second volatile memory, and a non-volatile memory, a method comprising:

determining whether a storage rate of the external data storage device is below a threshold;

in response to determining that the storage rate of the external data storage device is not below the threshold, sending a portion of data generated by the host to the first volatile memory for transfer to the external data storage device for storage; and in response to determining that the storage rate of the external data storage device is below the threshold:

sending the portion of the data generated by the host to the second volatile memory for transfer to the non-volatile memory for storage;

determining whether the storage rate of the external data storage device has increased above the threshold; and in response to determining that the storage rate of the external data storage device has increased above the threshold, sending the portion of the data stored in the non-volatile memory to the first volatile memory for transfer to the external data storage device for storage.

2. The method of claim 1, wherein determining whether the storage rate of the external data storage device is below the threshold comprises determining whether an available capacity of the first volatile memory is below a second threshold.

3. The method of claim 1, further comprising formatting the portion of the data to align with a granularity of the non-volatile memory and a non-volatile memory of the external data storage device.

4. The method of claim 1, wherein the portion of the data stored in the non-volatile memory is sent to the first volatile memory during idle time.

5. The method of claim 1, wherein the portion of the data stored in the non-volatile memory is sent to the first volatile memory while the host is generating other another portion of the data.

6. The method of claim 1, further comprising marking another portion of the data transferred to the external data storage device for storage as incomplete until the portion of the data stored in the non-volatile memory is transferred to the external data storage device.

7. The method of claim 1, further comprising interleaving the portion of the data stored in the non-volatile memory with another portion of the data generated by the host.

8. The method of claim 1, wherein the data comprises streamed video.

9. The method of claim 1, further comprising:

receiving information from the external data storage device regarding the external data storage device's sustainable write throughput; and calibrating operation of the host based on the sustainable write throughput.

10. The method of claim 9, wherein calibrating operation of the host comprises reducing a generation rate of the data based on the sustainable write throughput.

11. The method of claim 1, wherein a capacity of the non-volatile memory of the host is insufficient to store all of the data generated by the host.

12. The method of claim 1, wherein the external data storage device comprises an external solid-state drive (SSD).

13. The method of claim 1, wherein a memory of the external data storage device comprises a three-dimensional memory.

14. A host comprising:
a non-volatile memory;
a primary buffer;
a secondary buffer; and
one or more processors, individually or in combination, configured to:
  determine whether an available capacity of the primary buffer is below a threshold;
  in response to determining that the available capacity of the primary buffer is not below the threshold, send a portion of data generated by the host to the primary buffer for transfer to an external data storage device for storage; and
  in response to determining that the available capacity of the primary buffer is below the threshold:
    send the portion of the data generated by the host to the secondary buffer for transfer to the non-volatile memory for storage;
    determine whether the available capacity of the primary buffer is above the threshold; and
    in response to determining that the available capacity of the primary buffer is above the threshold, send the portion of the data stored in the non-volatile memory to the primary buffer for transfer to the external data storage device for storage.

15. The host of claim 14, wherein the one or more processors, individually or in combination, are further configured to format the portion of the data to align with a granularity of the non-volatile memory and a non-volatile memory of the external data storage device.

16. The host of claim 14, wherein the one or more processors, individually or in combination, are further configured to mark another portion of the data transferred to the external data storage device for storage as incomplete until the portion of the data stored in the non-volatile memory is transferred to the external data storage device for storage.

17. The host of claim 14, wherein the one or more processors, individually or in combination, are further configured to interleave the portion of the data stored in the non-volatile memory with another portion of the data generated by the host.

18. The host of claim 14, wherein the data comprises streamed video.

19. The host of claim 14, wherein the one or more processors, individually or in combination, are further configured to:
receive information from the external data storage device regarding the external data storage device's sustainable write throughput; and
reduce a generation rate of the data based on the sustainable write throughput.

20. A host comprising:
a non-volatile memory;
a primary buffer;
a secondary buffer; and
means for:
  determining whether an available capacity of the primary buffer is below a threshold;
  in response to determining that the available capacity of the primary buffer is not below the threshold, sending a portion of data generated by the host to the primary buffer for transfer to an external data storage device for storage; and
  in response to determining that the available capacity of the primary buffer is below the threshold:
    sending the portion of the data generated by the host to the secondary buffer for transfer to the non-volatile memory for storage;
    determining whether the available capacity of the primary buffer is above the threshold; and
    in response to determining that the available capacity of the primary buffer is above the threshold, sending the portion of the data stored in the non-volatile memory to the primary buffer for transfer to the external data storage device for storage.

* * * * *